United States Patent
Wang et al.

(10) Patent No.: US 9,426,439 B2
(45) Date of Patent: Aug. 23, 2016

(54) EXPOSING MEDIA PROCESSING FEATURES

(71) Applicant: INTEL CORPORATION, Santa Clara, CA (US)

(72) Inventors: Changliang Wang, Bellevue, WA (US); Yunbiao Lin, Shanghai (CN); Radhakrishnan Venkataraman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/796,035

(22) Filed: Mar. 12, 2013

(65) Prior Publication Data

US 2014/0270703 A1  Sep. 18, 2014

(51) Int. Cl.
*H04N 9/79* (2006.01)
*H04N 21/443* (2011.01)

(52) U.S. Cl.
CPC .............. *H04N 9/79* (2013.01); *H04N 21/443* (2013.01); *H04N 21/4432* (2013.01); *H04N 21/4436* (2013.01)

(58) Field of Classification Search
CPC .................. G09G 2330/021; G09G 2340/04; H04N 5/63; G06F 1/3203; G06F 1/3296
See application file for complete search history.

(56) References Cited

U.S. PATENT DOCUMENTS

| | | | |
|---|---|---|---|
| 2005/0213929 A1* | 9/2005 | Cheng | 386/46 |
| 2006/0248363 A1* | 11/2006 | Chen et al. | 713/300 |
| 2008/0119242 A1 | 5/2008 | Cho | |
| 2008/0218590 A1* | 9/2008 | Park et al. | 348/143 |
| 2009/0160841 A1* | 6/2009 | Fletcher et al. | 345/211 |
| 2009/0239587 A1* | 9/2009 | Negron et al. | 455/566 |
| 2009/0313484 A1 | 12/2009 | Millet et al. | |
| 2010/0057912 A1* | 3/2010 | Hiscock | 709/226 |
| 2010/0135642 A1* | 6/2010 | Song et al. | 386/109 |
| 2010/0321647 A1 | 12/2010 | Schuler et al. | |
| 2012/0086857 A1* | 4/2012 | Kim | G06F 9/4401 348/563 |
| 2012/0109798 A1* | 5/2012 | Shelton et al. | 705/34 |
| 2012/0169745 A1* | 7/2012 | Carter et al. | 345/520 |
| 2012/0170666 A1 | 7/2012 | Venkatasubramanian et al. | |
| 2012/0323606 A1* | 12/2012 | Ananthasubramaniam et al. | 705/3 |

FOREIGN PATENT DOCUMENTS

EP  1367559 A2  12/2003

OTHER PUBLICATIONS

Office Action received for United Kingdom Patent Application No. 1403349.2, mailed on Jul. 22, 2014, 7 pages.

* cited by examiner

*Primary Examiner* — Huy T Nguyen
(74) *Attorney, Agent, or Firm* — International IP Law Group, P.L.L.C.

(57) ABSTRACT

An apparatus and a system are described herein. The apparatus includes logic to render a video. The apparatus also includes logic to adjust a feature of a video in response to a power consumption, wherein the logic to adjust a feature of a video is integrated into an operating system of the apparatus.

26 Claims, 9 Drawing Sheets

EXPOSING MEDIA PROCESSING FEATURES

BACKGROUND ART

Mobile devices such as tablets and smart phones may operate using an operating system or framework that provides access to certain hardware resources of the device. The Android Framework includes a kernel, middleware, libraries, and various application programming interfaces (APIs) to access the device hardware. The media framework portion of the Android Framework is known as Stagefright. Stagefright enables various media functions. As used herein, media functions are video playback, video recording, audio playback, audio recording, image capture, image rendering, and the like.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

As discussed above, the Android Framework enables media playback and recording through Stagefright. Other services supported by Stagefright include a network protocol support for streaming data, media downloading, progressive playback, video telephony, audio codecs, speech codecs, video encoders and decoders, and image encoders and decoders. Stagefright does provide access to video processing, such as adjusting video quality. For example, the Android Framework does not support an application applying a denoise feature to media playback using Stagefright. Video processing, such as video denoising, is usually done by a programmable pipeline, such as a graphics rendering pipeline. Other video processing includes, but is not limited to, frame rate conversion (FRC), image stabilization, video scaling, composition, and Hue Saturation Brightness Contrast (HSBC). Video processing can consume a major part of power during media playback. Additionally, the Android Framework does not enable access to video processing features contained in graphics drivers or embedded into a processing unit, such as the Intel® brand processing units. As a result, the Android Framework enables media playback, recording, and capture without enabling adjustments to the processing features when performing media playback, recording, and capture.

Embodiments described herein enable an additional framework that adjusts media quality as it relates to power consumption. The additional framework provides access to media processing features embedded in the hardware and drivers of the device. Using the additional framework, an application can determine the amount of time to complete the media playback, capture the battery power remaining, and adjust one or more video processing features to reduce power consumption during media playback. As a result, the media functions can be performed in a power aware manner, where the application knows the amount of power available to the device and can adjust media processing features of the device to prolong the available power. Similarly, in embodiments, the application can determine the type of media function, capture the battery power remaining, and adjust one or more processing features to reduce power consumption during media recording. In this manner, an application can conserve power consumption through adjustments to media functions. Although the techniques provided herein are described using a video playback media function, any media function can be used. For example, video recording features may also be exposed and adjusted based on the available power of the device.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
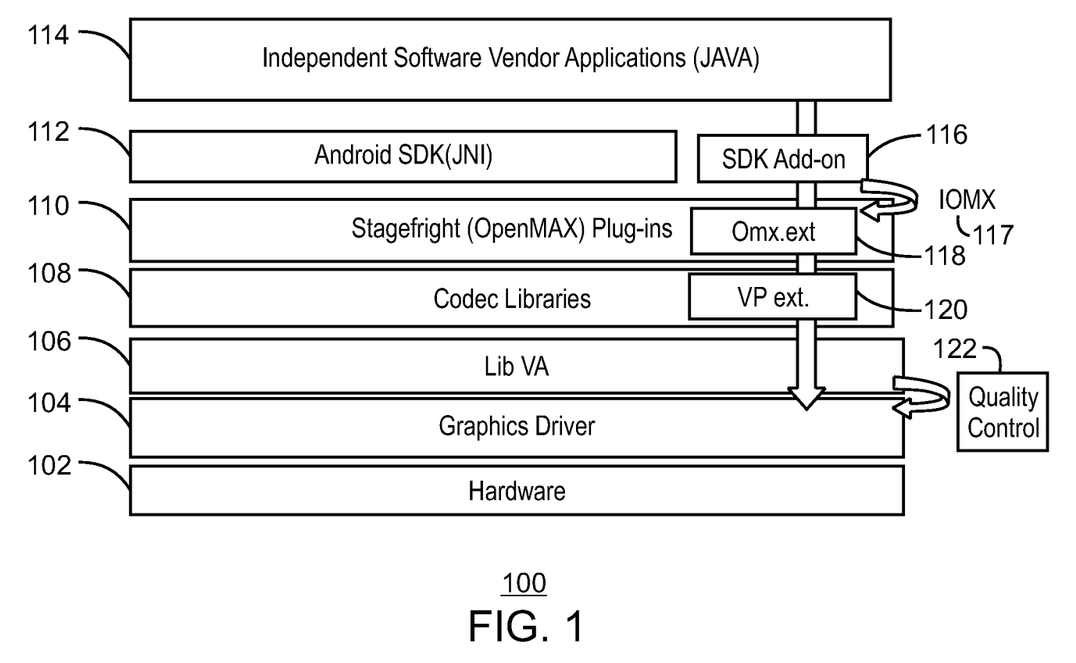
FIG. 1 illustrates an exposed video processing framework for a JAVA application.

FIG. 1 illustrates an exposed video processing framework 100 for a JAVA application. Although the video processing framework 100 described herein contains certain elements, a video processing framework may contain more or less elements than those described herein.

The video processing framework 100 includes hardware 102. The hardware 102 includes, but is not limited to a central processing unit (CPU), graphics processing unit (GPU), graphics hardware, media engines, digital signal processors (DSPs), hardware accelerators, data storage, microphone, speaker, display, storage device, and networking interface cards. The GPU and other graphics hardware may be operated using a graphics driver 104. In embodiments, the graphics driver 104 can issue commands and interrupts to the graphics hardware.

The video processing framework 100 also includes a video acceleration library (LibVA) 106. The LibVA 106 enables hardware accelerated video processing. For example, graphics hardware can be used to offload encoding and decoding processes from the CPU to enable hardware acceleration using LibVA 106. Other video processing features such as motion compensation, inverse discrete cosine transform, in-loop deblocking, intra-frame prediction, variable length decoding, and bit stream processing can be offloaded and accelerated using the LibVA 106.

At least one or more codec libraries 108 are included in the video processing framework 100. The codec libraries 108 include various codecs for the encoding and decoding of video and audio data. A Stagefright Layer 110 interfaces with the codec libraries 108 using an Open Media Acceleration (OpenMax) programming interface (IOMX). Through the use of IOMX, media applications can be designed in a platform independent manner. An Android Software Development Kit (SDK) JAVA Native Interface (JNI) 112 is used to enable applications 114 coded in JAVA to call and be called by libraries and native applications written in languages other than JAVA, such as C, C++, and assembly language. Accordingly, the Independent Software Vendor (ISV) Applications 114 are applications written in JAVA.

The Stagefright Layer 110 does not provide functionality of the applications 114 to access or modify video processing features. In order to give the applications 114 access to video processing features, an SDK Add-On 116 is used to obtain a pointer to the IOMX 117. The SDK Add-On 116 can use the IOMX 117 to access an OpenMax Extension 118. The OpenMax Extension 118 may be a component of an OpenMax integration layer and can be used to access various codecs within the codec libraries 108. Specifically, codecs used in the in video processing may be accessed using a video processing extension 120. The video processing extension accesses the LibVA 106 as well as the graphics drive 104 to execute the adjustments to the video processing controls as needed. The SDK Add-On 116 is used to expose video features within the Android Framework that are not accessible using the Stagefright Layer 110 and the Android SDK JNI 112. Further, the SDK Add-On 116 can be used to access video processing features that are embedded in the graphics drivers 104 and the hardware 102 of a system.

The quality control 122 refers to the quality of the media being played by the Android Framework. By altering or adjusting the exposed video processing features, the quality of the media may also be altered or adjusted. The quality of the media is related to the power consumption of a device that includes such a framework. When the quality of the media playback is high, each video processing feature may be used to produce a high quality media playback or recording. However, the use of the video processing feature in such a manner also consumes a large amount of power. Accordingly, the quality of the video may be reduced in order to reduce power consumption during media playback or recording.

Figure 2:
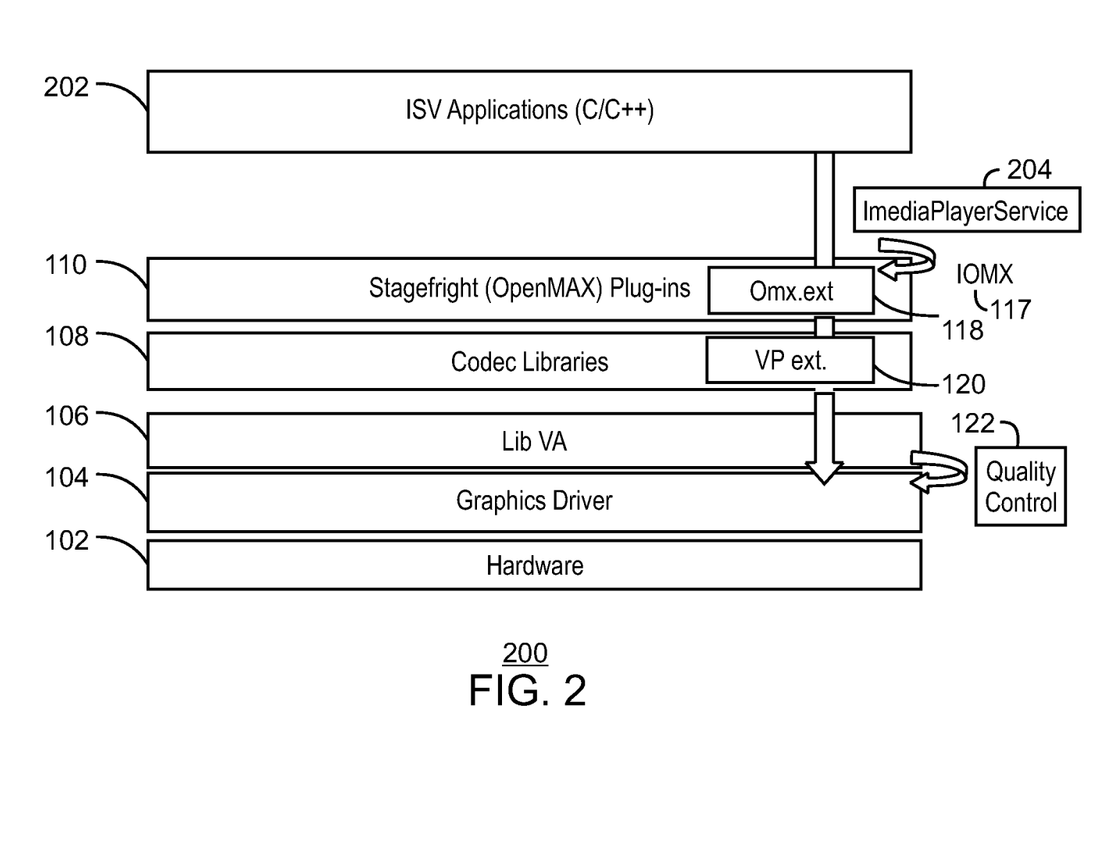
FIG. 2 illustrates an exposed video processing framework for a C/C++ application.

FIG. 2 illustrates an exposed video processing framework 200 for a C/C++ application. Although the video processing framework 200 described herein contains certain elements, a video processing framework may contain more or less elements than those described herein.

The video processing framework 200 includes the hardware 102, a graphics driver 104, a LibVA 106, a Codec Library 108, a Stagefright Layer 110, and Quality Control 122 described with respect to FIG. 1. The video processing framework 200 also includes Independent Software Vendor (ISV) Applications 202 written in C/C++. When the applications 202 are written in C or C++, the Android SDK JNI 112 is not used to interface between the applications 202 and the Stagefright Layer 110, as the applications 202 and the Stagefright Layer 110 are written in the same programming language. Thus, calls may be transferred between the applications 202 and the Stagefright Layer 110 without translation. Further, a media player service interface (IMediaPlayerService) 204 included in the Android Framework can be used to obtain the pointer to the IOMX 117 as discussed above. In this manner, IMediaPlayerService 204 is used to expose video features within the Android Framework that are not accessible using the Stagefright Layer 110 when the applications 202 are written in C or C++. In embodiments, the IMediaPlayerService 204 acts as a proxy to a media player service that executes the media functions. In examples, an application 202 can send video processing control to the media player service through IMediaPlayerSerivce 204. The media player service may then control features such as video processing through IOMX interfaces 117 to the codec libraries 108. Additionally, the applications 202 can be used to access video processing features that are embedded in the graphics drivers 104 and the hardware 102 of a system.

Figure 3:
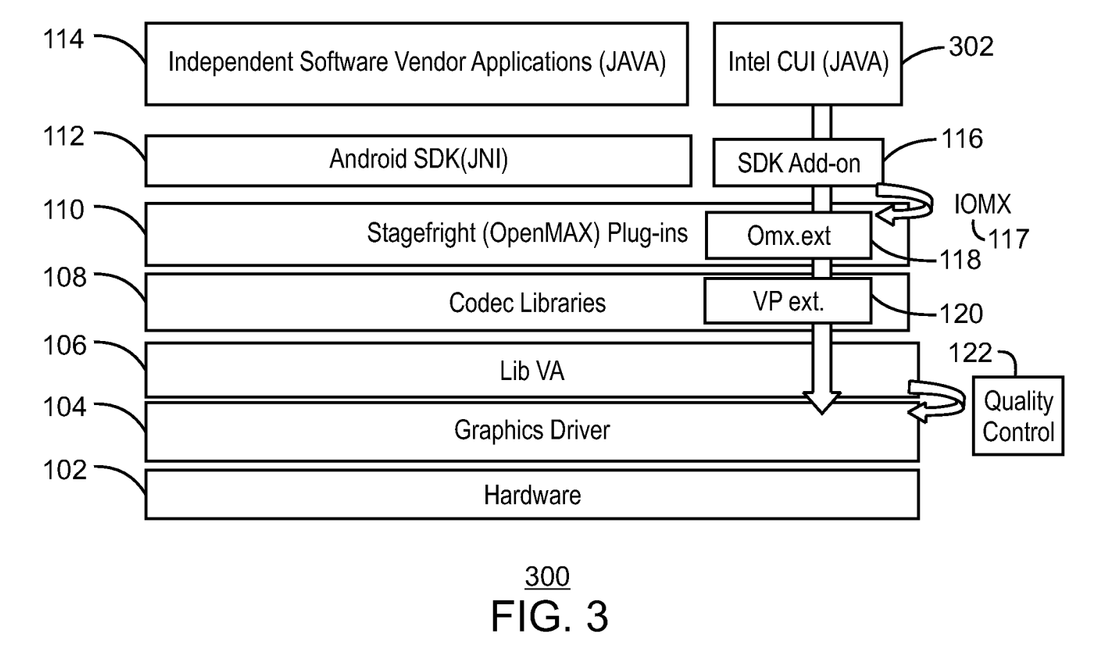
FIG. 3 illustrates an exposed video processing framework for a JAVA application with a Common User Interface (CUI)

FIG. 3 illustrates an exposed video processing framework 300 for a JAVA application with a Common User Interface (CUI) 302. Although the video processing framework 100 described herein contains certain elements, a video processing framework may contain more or less elements than those described herein.

The video processing framework 300 includes the hardware 102, a graphics driver 104, a LibVA 106, a Codec Library 108, an Stagefright Layer 110, Android SDK 112, ISV Application 114, SDK Add On 116, IOMX 117, Open Max Extension 118, video processing extension 120, and Quality Control 122 described with respect to FIG. 1. A CUI 302 is provided that enables an interface that is used to adjust video processing features. In embodiments, the CUI 302 is an Intel® CUI. Further, in embodiments, the CUI 302 enables global changes to the video processing features. The global changes are applied to each application 114, regardless of the video processing settings of the application 114. Moreover, in embodiments, a one or more power controls may also be available using the CUI 302. The power controls represent the power status of the device and components of the device. If the device power is lower than a threshold as determined by a user, then video processing features may be modified, adjusted, or disabled using the CUI 302.

Figure 4:
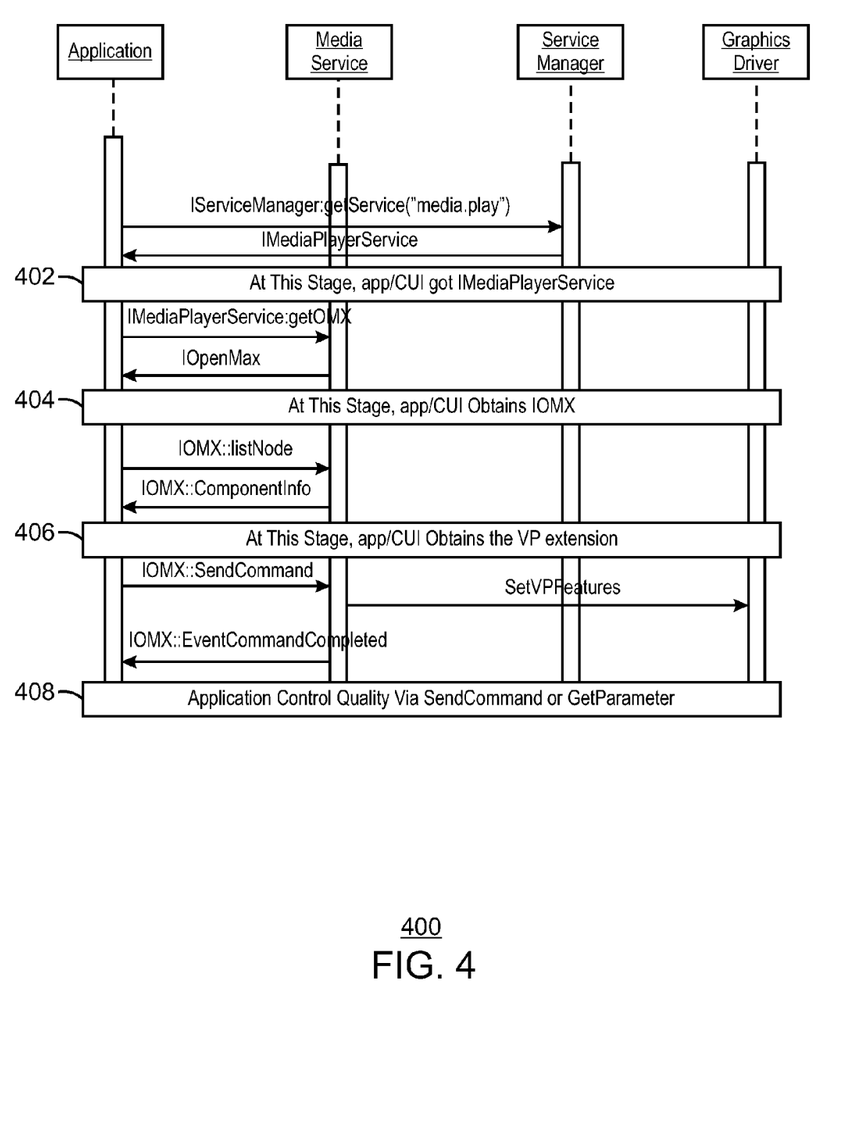
FIG. 4 is a diagram showing a control flow for exposing video processing features using a C/C++ application.

FIG. 4 is a diagram showing a control flow for exposing video processing features using a C/C++ application. At stage 402, the IMediaPlayerService is instantiated using an IServiceManager:getService ("media.play") command. At stage 404, the iMediaPlayerService is used to access the IOMX. At stage 406, the IOMX is used to list all the nodes to obtain the specific OMX component that is used to modify, alter, or adjust a video processing feature. As used herein, a node is the OMX component that corresponds to each codec within the codec libraries. At stage 408, a SendCommand(async) command or a GetParameter(sync) is used to modify, alter, or adjust a video processing feature as discussed above.

Figure 5:
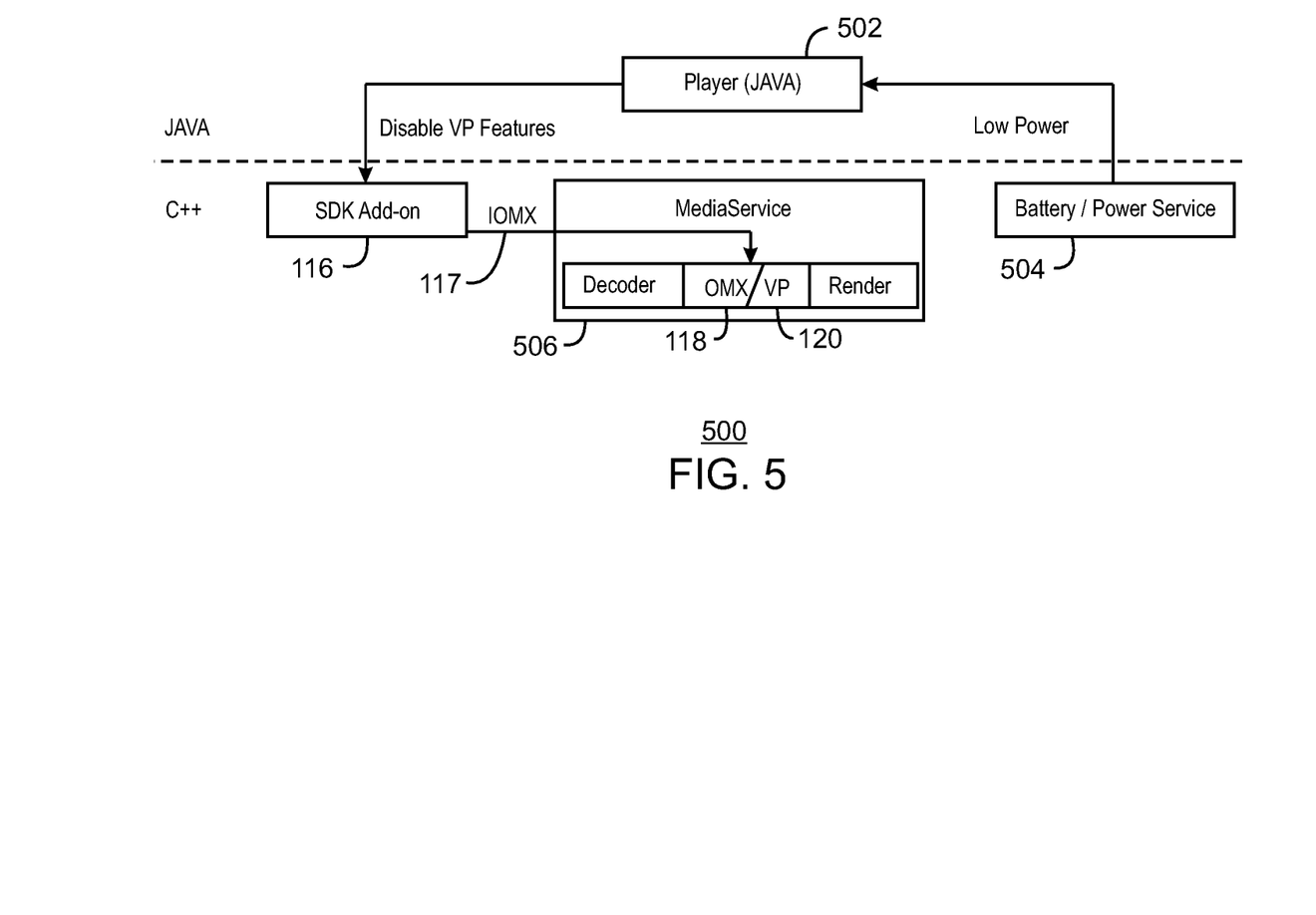
FIG. 5 is a block diagram of power control with a JAVA application.

FIG. 5 is a block diagram 500 of power control with a JAVA application. In FIG. 5, the JAVA Application is a JAVA player 502. The JAVA player 502 obtains a size of the media content. The JAVA player 502 also calculates how long the media playback should take to complete. A power status may be obtained from the power or battery service 504. Using the SDK Add-On 116, the JAVA player 502 can obtain the power consumption for each video processing feature used in the video playback. Specifically, the JAVA player 502 can obtain the power consumption from the graphics driver 104 or the hardware 102. The SDK Add-On 116 can use the IOMX 117 to access the OpenMax Extension 118 and the video processing extension 120 to expose the video features that can be adjusted, modified, or altered using the graphics driver 104 or the hardware 102. The media service 506 can also control the software components of the encoder and decoder functions.

The JAVA player 502 can then calculate the amount of playback time it can support based on the current video processing features and available power. If the amount of playback time is not sufficient to play the desired content in its entirety, then video processing features can be altered, adjusted, or modified in order to conserve power to such that the entire media playback can be supported. In embodiments, video processing features may be altered, adjusted, or modified using the SDK Add-On 116, OpenMax Extension 118 and video processing extension 120 a described above. The video processing features are adjusted within the Android Framework in a power aware manner in order to lower power consumption to meet the present media requirements of the system. The adjustments are done in a manner that avoids fragmentation of the Android Framework by utilizing the Android SDK add on as well as the IOMX interface. Other media features may be modified, adjusted, or disabled to perform media functions in their entirety based on the amount of power available. For example, the processing of image captured images can be adjusted based on the amount of power available to the device when the user desires to use the image capture media function.

In embodiments, a power control service may be used to collect the power consumption status of components within a portable device. The components include, but are not limited to, Graphics, Wi-Fi/3G/Bluetooth, Display and the operating system. With the power consumption information, a video playback scheduler can calculate all possible solutions to make sure the video can be played to the end. If the video playback could not be finished with current power status, the video playback scheduler may enable a user to select a proposed solution. In embodiments, the user may select the proposed solution using a CUI. Further, in embodiments, the power control service may be referred to as a power state sampler. As a result, the granularity of the video playback is selected based on the power status of the device. Moreover, the video playback scheduler may also determine what action to take based on the current power status without presenting a solution to the user. Specifically, the video playback scheduler may modify, alter, adjust or disable video processing features. For example, the video playback scheduler can reduce the frame rate of the video or disable certain playback features such as in-loop deblocking.

The video playback scheduler together with the power control service can control the video playback on various bases of granularity. For example, when the power status of the battery is down to 40% of the total available power, the video playback scheduler can disable certain features. When power status of the battery is down to 20% of the total available power, the video playback scheduler can shut down unused hardware. The actions taken by the video playback scheduler to conserve power can become more serve as the available power declines. In embodiments, the video playback scheduler can call each component within a graphics rendering pipeline to perform quality scaling, such as frame rate reducing and disabling some video post-processing features in order to conserve power. Further, each component within the graphics rendering pipeline sends scalable quality control options to the scheduler, prior to the scheduler modifying, altering, or disabling media features.

Figure 6:
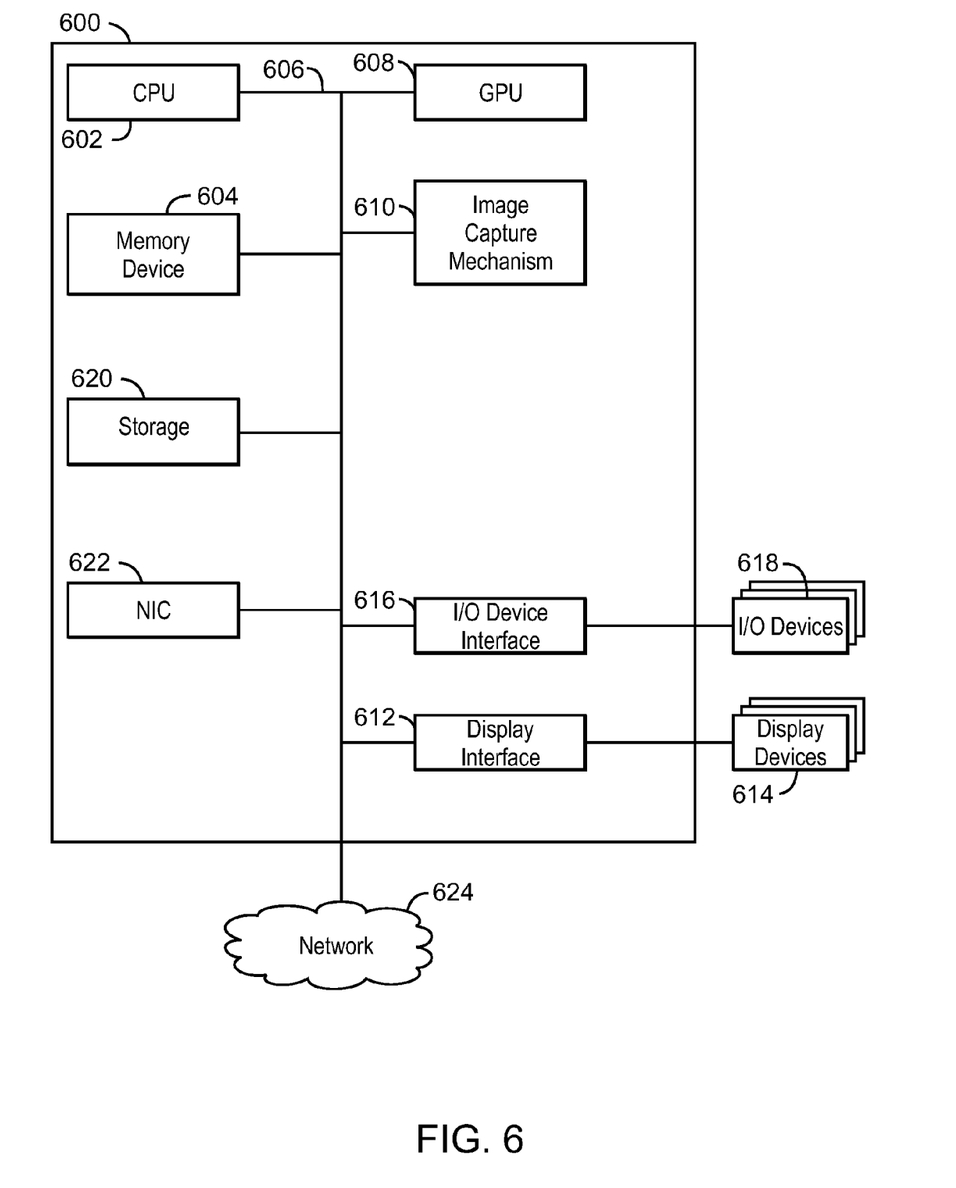
FIG. 6 is a block diagram of a computing device that may be used in accordance with embodiments.

FIG. 6 is a block diagram of a computing device 600 that may be used in accordance with embodiments. The computing device 600 may be, for example, a laptop computer, desktop computer, ultrabook, tablet computer, mobile device, or server, among others. The computing device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the computing device 600 may include more than one CPU 602.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The computing device 600 includes an image capture mechanism 610. In embodiments, the image capture mechanism 610 is a camera, stereoscopic camera, scanner, infrared sensor, or the like.

The CPU 602 may be linked through the bus 606 to a display interface 612 configured to connect the computing device 600 to a display device 614. The display device 614 may include a display screen that is a built-in component of the computing device 600. The display device 614 may also include a computer monitor, television, or projector, among others, that is externally connected to the computing device 600.

The CPU 602 may also be connected through the bus 606 to an input/output (I/O) device interface 616 configured to connect the computing device 600 to one or more I/O devices 618. The I/O devices 618 may include, for example, a keyboard and a pointing device, wherein the pointing device may include a touchpad or a touchscreen, among others. The I/O devices 618 may be built-in components of the computing device 600, or may be devices that are externally connected to the computing device 600.

The computing device also includes a storage device 620. The storage device 620 is a physical memory such as a hard drive, an optical drive, a thumbdrive, an array of drives, or any combinations thereof. The storage device 620 may also include remote storage drives. The computing device 600 may also include a network interface controller (NIC) 622 may be configured to connect the computing device 600 through the bus 606 to a network 624. The network 624 may be a wide area network (WAN), local area network (LAN), or the Internet, among others.

The block diagram of FIG. 6 is not intended to indicate that the computing device 600 is to include all of the components shown in FIG. 6. Further, the computing device 600 may include any number of additional components not shown in FIG. 6, depending on the details of the specific implementation.

Figure 7:
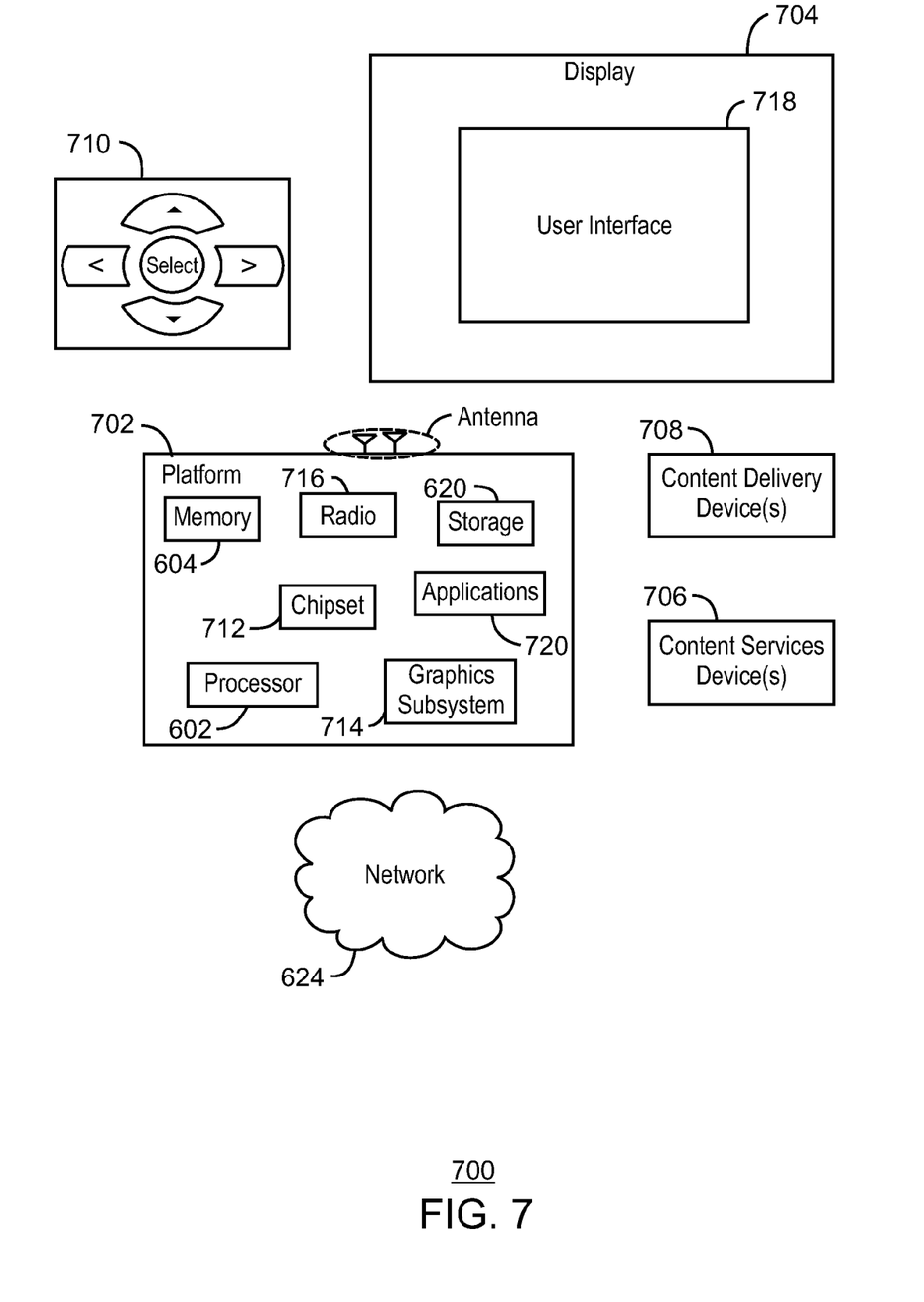
FIG. 7 is a block diagram of an exemplary system that exposes media features.

FIG. 7 is a block diagram of an exemplary system 700 that exposes media features. Like numbered items are as described with respect to FIG. 6. In some embodiments, the system 700 is a media system. In addition, the system 700 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 700 comprises a platform 702 coupled to a display 704. The platform 702 may receive content from a content device, such as content services device(s) 706 or content delivery device(s) 708, or other similar content sources. A navigation controller 710 including one or more navigation features may be used to interact with, for example, the platform 702 and/or the display 704. Each of these components is described in more detail below.

The platform 702 may include any combination of a chipset 712, a central processing unit (CPU) 602, a memory device 604, a storage device 620, a graphics subsystem 714, applications 720, and a radio 716. The chipset 712 may provide intercommunication among the CPU 602, the memory device 604, the storage device 622, the graphics subsystem 714, the applications 720, and the radio 716. For example, the chipset 712 may include a storage adapter (not shown) capable of providing intercommunication with the storage device 620. The applications 720 may be the applications 114, the applications 202, or the applications 502 as described above.

The CPU 602 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 602 includes multi-core processor(s), multi-core mobile processor(s), or the like. The memory device 604 may be implemented as a volatile memory device such as, but not limited to, a Random Access Memory (RAM), Dynamic Random Access Memory (DRAM), or Static RAM (SRAM). The storage device 620 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 620 includes technology to increase the storage performance enhanced protection for valuable digital media when multiple hard drives are included, for example.

The graphics subsystem 714 may perform processing of images such as still or video for display. The graphics subsystem 714 may include a graphics processing unit (GPU), such as the GPU 608, or a visual processing unit (VPU), for example. An analog or digital interface may be used to communicatively couple the graphics subsystem 714 and the display 704. For example, the interface may be any of a High-Definition Multimedia Interface, DisplayPort, wireless HDMI, and/or wireless HD compliant techniques. The graphics subsystem 714 may be integrated into the CPU 602 or the chipset 712. Alternatively, the graphics subsystem 714 may be a stand-alone card communicatively coupled to the chipset 712.

The graphics and/or video processing techniques described herein may be implemented in various hardware architectures. For example, graphics and/or video functionality may be integrated within the chipset 712. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 716 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 716 may operate in accordance with one or more applicable standards in any version.

The display 704 may include any television type monitor or display. For example, the display 704 may include a computer display screen, touch screen display, video monitor, television, or the like. The display 704 may be digital and/or analog. In some embodiments, the display 704 is a holographic display. Also, the display 704 may be a transparent surface that may receive a visual projection. Such projections may convey various forms of information, images, objects, or the like. For example, such projections may be a visual overlay for a mobile augmented reality (MAR) application. Under the control of one or more applications 720, the platform 702 may display a user interface 718 on the display 704.

The content services device(s) 706 may be hosted by any national, international, or independent service and, thus, may be accessible to the platform 702 via the Internet, for example. The content services device(s) 706 may be coupled to the platform 702 and/or to the display 704. The platform 702 and/or the content services device(s) 706 may be coupled to a network 624 to communicate (e.g., send and/or receive) media information to and from the network 624. The content delivery device(s) 708 also may be coupled to the platform 702 and/or to the display 704.

The content services device(s) 706 may include a cable television box, personal computer, network, telephone, or Internet-enabled device capable of delivering digital information. In addition, the content services device(s) 706 may include any other similar devices capable of unidirectionally or bidirectionally communicating content between content providers and the platform 702 or the display 704, via the network 624 or directly. It will be appreciated that the content may be communicated unidirectionally and/or bidirectionally to and from any one of the components in the system 700 and a content provider via the network 624. Examples of content may include any media information including, for example, video, music, medical and gaming information, and so forth.

The content services device(s) 706 may receive content such as cable television programming including media information, digital information, or other content. Examples of content providers may include any cable or satellite television or radio or Internet content providers, among others.

In some embodiments, the platform 702 receives control signals from the navigation controller 710, which includes one or more navigation features. The navigation features of the navigation controller 710 may be used to interact with the user interface 718, for example. The navigation controller 710 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 710 may be echoed on the display 704 by movements of a pointer, cursor, focus ring, or other visual indicators displayed on the display 704. For example, under the control of the applications 720, the navigation features located on the navigation controller 710 may be mapped to virtual navigation features displayed on the user interface 718. In some embodiments, the navigation controller 710 may not be a separate component but, rather, may be integrated into the platform 702 and/or the display 704.

The system 700 may include drivers (not shown) that include technology to enable users to instantly turn on and off the platform 702 with the touch of a button after initial boot-up, when enabled, for example. Program logic may allow the platform 702 to stream content to media adaptors or other content services device(s) 706 or content delivery device(s) 708 when the platform is turned "off." In addition, the chipset 712 may include hardware and/or software support for 6.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 700 may be integrated. For example, the platform 702 and the content services device(s) 706 may be integrated; the platform 702 and the content delivery device(s) 708 may be integrated; or the platform 702, the content services device(s) 706, and the content delivery device(s) 708 may be integrated. In some embodiments, the platform 702 and the display 704 are an integrated unit. The display 704 and the content service device(s) 706 may be integrated, or the display 704 and the content delivery device(s) 708 may be integrated, for example.

The system 700 may be implemented as a wireless system or a wired system. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 7.

Figure 8:
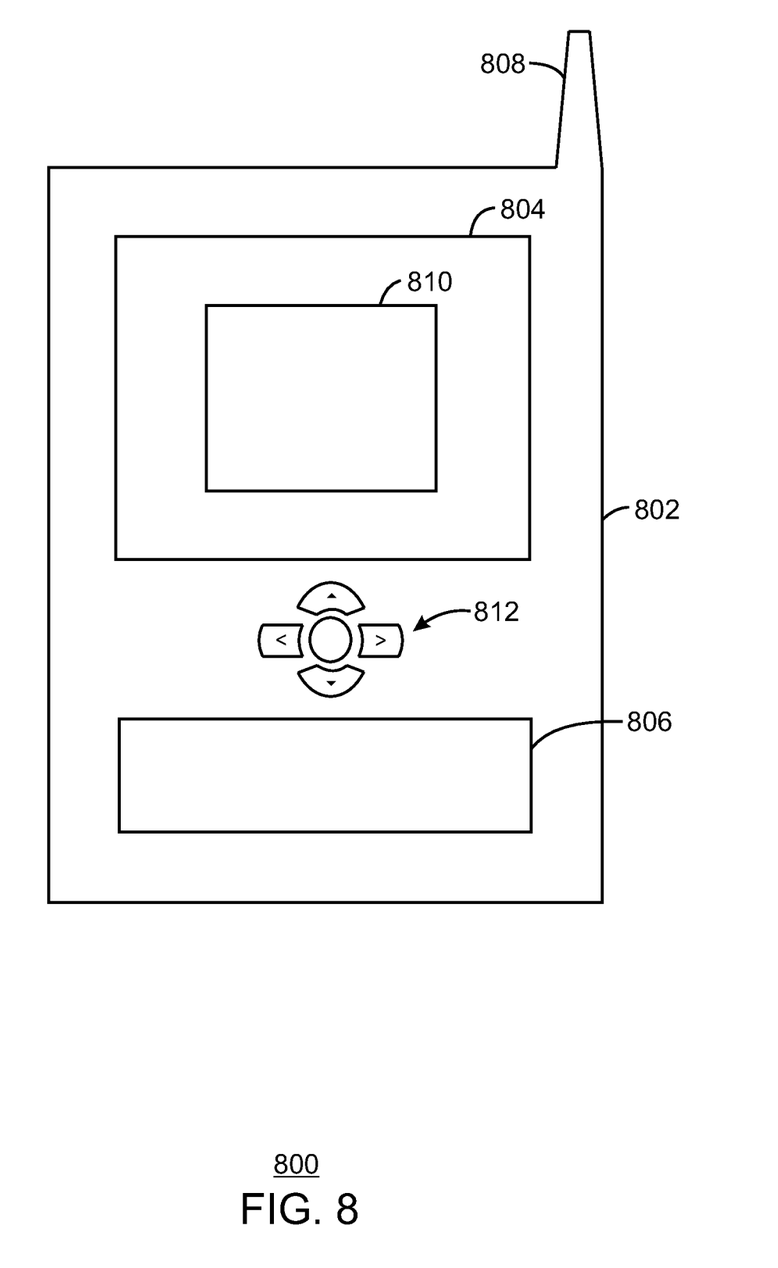
FIG. 8 is a schematic of a small form factor device in which the system of FIG. 7 may be embodied.

FIG. 8 is a schematic of a small form factor device 800 in which the system 700 of FIG. 7 may be embodied. Like numbered items are as described with respect to FIG. 7. In some embodiments, for example, the device 800 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 8, the device 800 may include a housing 802, a display 804, an input/output (I/O) device 806, and an antenna 808. The device 800 may also include navigation features 812. The display 804 may include any suitable display 810 unit for displaying information appropriate for a mobile computing device. The I/O device 806 may include any suitable I/O device for entering information into a mobile computing device. For example, the I/O device 806 may include an alphanumeric keyboard, a numeric keypad, a touch pad, input keys, buttons, switches, rocker switches, microphones, speakers, a voice recognition device and software, or the like. Information may also be entered into the device 800 by way of microphone. Such information may be digitized by a voice recognition device.

Figure 9:
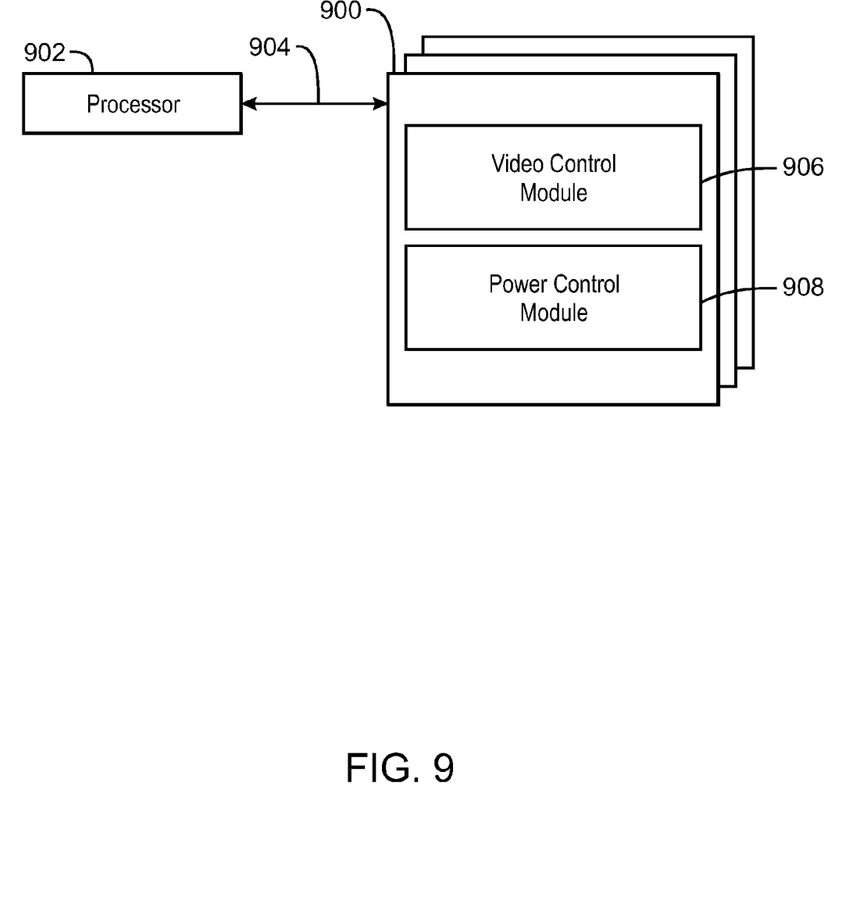
FIG. 9 is a block diagram showing tangible, non-transitory computer-readable media that stores code for exposing media processing features.

FIG. 9 is a block diagram showing tangible, non-transitory computer-readable media 900 that stores code for exposing media processing features. The tangible, non-transitory computer-readable media 900 may be accessed by a processor 902 over a computer bus 904. Furthermore, the tangible, non-transitory computer-readable medium 900 may include code configured to direct the processor 902 to perform the methods described herein.

The various software components discussed herein may be stored on one or more tangible, non-transitory computer-readable media 900, as indicated in FIG. 9. For example, a video control module 906 may be configured to perform a media function. Additionally, the video control module adjusts one or more features of the media function based on the power status of the system. A power module 908 may be configured to determine a power status of a system.

The block diagram of FIG. 9 is not intended to indicate that the tangible, non-transitory computer-readable medium 900 is to include all of the components shown in FIG. 9. Further, the tangible, non-transitory computer-readable medium 900 may include any number of additional components not shown in FIG. 9, depending on the details of the specific implementation.

Example 1

An apparatus is described herein. The apparatus includes logic to render a video. Additionally, the apparatus includes logic to adjust a feature of a video in response to a power consumption when the apparatus renders the video, wherein the logic to adjust a feature of a video is integrated into an operating system of the apparatus.

The logic to adjust the feature of the video may be an application programming interface (API) that enables an application of the apparatus to adjust the feature of the video in response to the power consumption. The apparatus may also include logic to determine a time of remaining power of a battery of the apparatus and logic to adjust the feature of the video such that the video completely renders within the time of remaining power of the battery of the apparatus. Additionally, the apparatus may include logic for a user to adjust the feature of the video by overriding the logic to adjust the feature of the video based on power consumption, and logic for a control panel wherein a user can adjust the feature of the video. Further, the apparatus may include logic to determine a length of time to render the video completely, logic to determine a power status of a battery, logic to determine the power consumption from the battery for the feature of the video, logic to calculate the length of time that the video can be rendered using the feature based on the power consumption from the battery and the power status of the battery, and logic to disable the feature so that the video may be completely renders. The operating system may be an Android operating system. Also, the power consumption may be reduced when the feature of the video is modified or disabled. The feature may be a video processing feature.

Example 2

A system is described herein. The system includes a processor that is configured to execute stored instructions and a storage device that stores instructions, wherein the storage device includes processor executable code that, when executed by the processor, is configured to perform a media function. The processor executable code is also configured to determine a power status of the system, and adjust one or more features of the media function based on the power status of the system.

The one or more features may be video processing features. Determining the power status of the system may include a determination of a time of remaining power of a battery of the system. A command user interface may provide settings that a user can modify in order to adjust the one or more features of the media function based on the power status of the system. A power control service may obtain a power consumption status for each function or component of the system. Further, a video playback scheduler may determine if the media function can be completed based on the power status of the system. The system may perform the media function in a power aware fashion. Additionally, the one or more features may include at least one of a frame rate conversion (FRC), image stabilization, video scaling, composition, and Hue Saturation Brightness Contrast (HSBC), any other processing that modifies the media function, or any combination thereof.

Example 3

A system is described herein. The system includes a power control service, wherein the power control service is used to collect the power consumption status of a component of the system. The system also includes a video playback scheduler, wherein the video playback scheduler calculates all possible solutions to ensure the system renders video in its entirety using and modifies one or more video processing features using an additional framework of the system.

A graphics rendering pipeline may send scalable quality control options to the video playback scheduler. Additionally, a command user interface modifies the one or more video processing features of the system.

Example 4

A tangible, non-transitory, computer-readable medium is described herein. The tangible, non-transitory, computer-readable medium includes code to direct a processor to perform a media function, determine a power status of a system, and adjust one or more features of the media function based on the power status of the system.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus for exposing media processing features, the apparatus comprising:
    logic to render a video on a device, wherein the device comprises a graphics driver;
    logic to enable an add-on framework to provide access to a variable length decoding feature of the video embedded in the graphics driver, wherein the add-on framework comprises an SDK Add-on, an IMEdiaPlayerService, or a Common User Interface (CUI), wherein the add-on framework accesses a coder-decoder (codec) within codec libraries to encode and decode the feature of the video embedded in the graphics driver, wherein the add-on framework exposes the encoded and decoded feature of the video embedded in the graphics driver; and
    logic to adjust the variable length decoding feature of the video embedded in the graphics driver in response to a power consumption when the apparatus renders the video.

2. The apparatus of claim 1, wherein the logic to adjust the feature of the video embedded in the graphics driver is an application programming interface (API) that enables an application of the apparatus to adjust the feature of the video embedded in the graphics driver in response to the power consumption.

3. The apparatus of claim 1, further comprising logic to determine a time of remaining power of a battery of the apparatus and to adjust the feature of the video embedded in the graphics driver such that the video completely renders within the time of remaining power of the battery of the apparatus.

4. The apparatus of claim 1, further comprising logic for a user to adjust the feature of the video embedded in the graphics driver by overriding the logic to adjust the feature of the video embedded in the graphics driver based on power consumption.

5. The apparatus of claim 1, further comprising logic for a control panel wherein a user can adjust the feature of the video embedded in the graphics driver.

6. The apparatus of claim 1, further comprising:
    logic to determine a length of time to render the video embedded in the graphics driver completely;
    logic to determine a power status of a battery;
    logic to determine the power consumption from the battery for the feature of the video embedded in the graphics driver;
    logic to calculate the length of time that the video embedded in the graphics driver can be rendered using the feature based on the power consumption from the battery and the power status of the battery; and
    logic to disable the feature so that the video embedded in the graphics driver may be completely rendered.

7. The apparatus of claim 1, wherein logic is integrated into an operating system, wherein the operating system is an Android operating system.

8. The apparatus of claim 1, wherein the power consumption is reduced when the feature of the video is modified or disabled.

9. The apparatus of claim 1, wherein the feature is a video processing feature.

10. A system for exposing media processing features, comprising:
    a processor that is configured to execute stored instructions and a storage device that stores instructions, wherein the storage device includes processor executable code that, when executed by the processor, is configured to:
    perform a media function on the system, wherein the system comprises a graphics driver, and wherein a variable length decoding feature is embedded in the graphics driver;
    access the variable length decoding feature of the media function embedded in the graphics driver using an add-on framework, wherein the add-on framework comprises an SDK Add-on, an IMEdiaPlayerService, or a Common User Interface (CUI), wherein the add-on framework accesses a coder-decoder (codec) within codec libraries to encode and decode the variable length decoding feature of the media function embedded in the graphics driver, wherein the add-on framework exposes the encoded and decoded feature of the media function embedded in the graphics driver;
    determine a power status of the system; and
    adjust the variable length decoding features of the media function embedded in the graphics driver based on the power status of the system.

11. The system of claim 10, wherein the one or more features embedded in the graphics driver are video processing features.

12. The system of claim 10, wherein determining the power status of the system includes a determination of a time of remaining power of a battery of the system.

13. The system of claim 10, wherein a command user interface provides settings that a user can modify in order to adjust the one or more features of the media function embedded in the graphics driver based on the power status of the system.

14. The system of claim 10, wherein a power control service obtains a power consumption status for each function or component of the system.

15. The system of claim 10, wherein a video playback scheduler determines if the media function can be completed based on the power status of the system.

16. The system of claim 10, wherein the system performs the media function in a power aware fashion.

17. The system of claim 10, wherein the one or more features embedded in the graphics driver include at least one of a frame rate conversion (FRC), image stabilization, video scaling, composition, and Hue Saturation Brightness Contrast (HSBC), any other processing that modifies the media function, or any combination thereof.

18. A system for exposing media processing features, comprising:
  a power control service, wherein the power control service is used to collect the power consumption status of a component of the system; and
  a video playback scheduler, wherein the video playback scheduler calculates all possible solutions to ensure the system renders video in its entirety using and modifying a variable length decoding processing feature embedded in a graphics driver of the system using an additional framework of the system.

19. The system of claim 18, wherein a graphics rendering pipeline sends scalable quality control options to the video playback scheduler.

20. The system of claim 18, wherein a command user interface modifies the one or more video processing features embedded in the graphics driver of the system.

21. A tangible, non-transitory, computer-readable medium comprising code to direct a processor to:
  perform a media function on a device that comprises a graphics driver, wherein a motion compensation feature is embedded in the graphics driver;
  enable an add-on framework to provide access to the motion compensation feature of the media function embedded in the graphics driver, wherein the add-on framework exposes the motion compensation feature of the media function embedded in the graphics driver;
  determine a power status of a system; and
  adjust the motion compensation feature of the media function based on the power status of the system.

22. The computer-readable medium of claim 21, wherein the media function is a video playback function, and the one or more features of the media function embedded in the graphics driver are video processing features.

23. The apparatus of claim 1, wherein the feature is embedded in a central processing unit, a graphics processing unit, or graphics hardware.

24. The system of claim 10, wherein the feature is embedded in a central processing unit, a graphics processing unit, or graphics hardware.

25. The system of claim 10, wherein the feature is embedded in a central processing unit, a graphics processing unit, or graphics hardware.

26. The computer-readable medium of claim 21, wherein the feature is embedded in a central processing unit, a graphics processing unit, or graphics hardware.

* * * * *